UNITED STATES PATENT OFFICE.

ROBERT E. SCHMIDT, OF ELBERFELD, GERMANY, ASSIGNOR TO THE FARBENFABRIKEN, VORMALS FR. BAYER & CO., OF SAME PLACE.

ALIZARINE DYE.

SPECIFICATION forming part of Letters Patent No. 476,491, dated June 7, 1892.

Application filed November 18, 1891. Serial No. 412,303. (Specimens.)

*To all whom it may concern:*

Be it known that I, ROBERT E. SCHMIDT, doctor of philosophy, chemist, (assignor to the FARBENFABRIKEN, VORMALS FR. BAYER & Co., of Elberfeld,) a subject of the Emperor of Germany, residing at Elberfeld, Germany, have invented a new and useful Improvement in the Manufacture of a Valuable Alizarine Dye-Stuff, of which I give in the following a clear and exact description.

My invention relates to the production of a new coloring-matter derived from alizarine by treating with ammonia that compound which is formed when salicylic acid acts upon the anthradiquinone resulting by the oxidation of alizarine bordeaux in sulphuric-acid solution with manganese, as described in a separate specification.

For carrying out my process practically I proceed as follows: One hundred kilos of a paste containing ten per cent. of that anthradiquinone salicylic-acid compound which is obtained by the action of salicylic acid upon the so-called "anthradiquinone" resulting by the oxidation of alizarine bordeaux in concentrated-sulphuric-acid solution with manganese, and which is described in a separate specification filed November 18, 1891, Serial No. 412,302, are, together with five hundred liters of water and two hundred kilos of ammonia liquid at twenty per cent. of ammonia, heated on the water bath until a portion of the liquid yields, when poured into acids, a precipitate soluble in concentrated sulphuric acid with reddish-violet color. When the color of the sulphuric-acid solution, obtained in this manner, is no more changed, the whole mixture is poured into about two thousand five hundred liters of water heated to boiling and decomposed by the addition of acids. The new coloring-matter, which separates as a blackish-violet precipitate, can be filtered off, washed out, and employed for dyeing. It forms in dry state an olive-colored powder with metallic luster, dissolves in cold and hot water only very sparingly, in sodium carbonate with blue color, in soda-lye with greenish-blue and in ammonia with reddish-blue color. By concentrated sulphuric acid it is dissolved with reddish-violet color, and out of this sulphuric-acid solution reddish-brown flakes are precipitated on adding water. It is soluble in glacial acetic acid and in alcohol with bluish-red color. It produces on wool mordanted with chromium salts a beautiful bluish green.

Having thus described my invention and in what manner it can be performed, that which I claim as new, and desire to secure by Letters Patent, is—

1. The process of making a new alizarine dye, which consists in oxidizing alizarine bordeaux in sulphuric-acid solution with manganese, treating the resulting anthradiquinone with salicylic acid, and treating the resulting compound with ammonia.

2. The new coloring-matter, which in a dry state is an olive-colored powder with metallic luster, sparingly soluble in water, easily in sodium carbonate with blue color, in soda-lye with greenish-blue and in ammonia and in glacial acetic acid and alcohol with reddish-blue color, and in concentrated sulphuric acid with reddish-violet color, from which solution reddish-brown flakes are precipitated by adding water, and on wool mordanted with chromium salts it produces a very clear bluish green.

In testimony whereof I have signed my name in the presence of two subscribing witnesses.

ROBERT E. SCHMIDT.

Witnesses:
RUDOLPH FRICKE.
WM. ESSENWEIN.